United States Patent
Gopalan et al.

(10) Patent No.: US 7,588,626 B2
(45) Date of Patent: Sep. 15, 2009

(54) COMPOSITE MIXED OXIDE IONIC AND ELECTRONIC CONDUCTORS FOR HYDROGEN SEPARATION

(75) Inventors: Srikanth Gopalan, Westborough, MA (US); Uday B. Pal, Dover, MA (US); Annamalai Karthikeyan, Quincy, MA (US); Cui Hengdong, Allston, MA (US)

(73) Assignee: Trustees of Boston University, Boston, MA (US)

( * ) Notice: Subject to any disclaimer, the term of this patent is extended or adjusted under 35 U.S.C. 154(b) by 358 days.

(21) Appl. No.: 11/255,650

(22) Filed: Oct. 21, 2005

(65) Prior Publication Data

US 2006/0191408 A1    Aug. 31, 2006

Related U.S. Application Data

(60) Provisional application No. 60/630,368, filed on Nov. 23, 2004.

(51) Int. Cl.
*B01D 53/22* (2006.01)
(52) U.S. Cl. .......... 95/45; 95/54; 95/55; 96/4; 96/10; 96/11; 252/519.1; 252/520.1; 252/520.2; 252/521.1; 429/17; 429/33; 423/650; 423/651
(58) Field of Classification Search .......... 95/45, 95/54, 55, 56; 96/4, 10, 11; 252/518.1, 519.1, 252/519.12, 520.1, 520.2, 520.5, 521.1; 429/13, 429/17, 30, 33; 204/295; 423/648.1, 650, 423/651; 48/127.9
See application file for complete search history.

(56) References Cited

U.S. PATENT DOCUMENTS

| | | | |
|---|---|---|---|
| 3,562,135 | A | 2/1971 | Marincek |
| 4,108,743 | A | 8/1978 | Minck |
| 4,804,448 | A | 2/1989 | Sammells et al. |
| 4,808,448 | A | 2/1989 | Cox et al. |
| 4,865,925 | A | 9/1989 | Ludwig et al. |
| 4,908,113 | A | 3/1990 | Marianowski et al. |
| 5,089,094 | A | 2/1992 | Ogasawara et al. |
| 5,273,628 | A | 12/1993 | Liu et al. |
| 5,306,411 | A | 4/1994 | Mazanec et al. |
| 5,312,525 | A | 5/1994 | Pal et al. |

(Continued)

FOREIGN PATENT DOCUMENTS

WO    WO-96/09360    3/1996

(Continued)

OTHER PUBLICATIONS

U.S. Appl. No. 60/691,007.

(Continued)

*Primary Examiner*—Jason M Greene
(74) *Attorney, Agent, or Firm*—Wilmer Cutler Pickering Hale and Dorr LLP.

(57) ABSTRACT

A mixed ionic and electronic conducting membrane includes a two-phase solid state ceramic composite, wherein the first phase comprises an oxygen ion conductor and the second phase comprises an n-type electronically conductive oxide, wherein the electronically conductive oxide is stable at an oxygen partial pressure as low as $10^{-20}$ atm and has an electronic conductivity of at least 1 S/cm. A hydrogen separation system and related methods using the mixed ionic and electronic conducting membrane are described.

37 Claims, 6 Drawing Sheets

U.S. PATENT DOCUMENTS

| | | | |
|---|---|---|---|
| 5,380,467 A | | 1/1995 | Lin et al. |
| 5,387,330 A | * | 2/1995 | Taniguchi et al. ............. 429/33 |
| 5,447,555 A | | 9/1995 | Ye et al. |
| 5,478,444 A | * | 12/1995 | Liu et al. ...................... 429/33 |
| 5,509,362 A | | 4/1996 | Lyon |
| 5,567,286 A | | 10/1996 | Pal et al. |
| 5,616,223 A | * | 4/1997 | Shen et al. .................. 204/295 |
| 5,714,091 A | | 2/1998 | Mazanec et al. |
| 5,962,122 A | | 10/1999 | Walpita et al. |
| 5,976,345 A | | 11/1999 | Pal et al. |
| 6,146,549 A | | 11/2000 | Mackay et al. |
| 6,153,163 A | * | 11/2000 | Prasad et al. ................ 423/246 |
| 6,162,334 A | | 12/2000 | Ray et al. |
| 6,165,553 A | | 12/2000 | Chen et al. |
| 6,214,757 B1 | * | 4/2001 | Schwartz et al. ............... 95/56 |
| 6,235,417 B1 | * | 5/2001 | Wachsman et al. ............. 95/56 |
| 6,287,432 B1 | | 9/2001 | Mazanec et al. |
| 6,296,687 B2 | * | 10/2001 | Wachsman et al. ............. 95/55 |
| 6,471,921 B1 | * | 10/2002 | Van Calcar et al. ...... 252/519.1 |
| 6,541,159 B1 | | 4/2003 | Li et al. |
| 6,641,626 B2 | | 11/2003 | Van Calcar et al. |
| 6,677,070 B2 | | 1/2004 | Kearl |
| 6,869,722 B2 | | 3/2005 | Kearl |
| 6,896,992 B2 | | 5/2005 | Kearl |
| 7,229,537 B2 | * | 6/2007 | Chen et al. ..................... 95/54 |
| 7,258,820 B2 | * | 8/2007 | Elangovan et al. ............. 95/55 |
| 2003/0037488 A1 | | 2/2003 | Van Calcar et al. |
| 2004/0091609 A1 | | 5/2004 | Kearl |
| 2004/0101729 A1 | | 5/2004 | Kearl |
| 2005/0252372 A1 | * | 11/2005 | Gopalan ......................... 95/55 |
| 2006/0234098 A1 | | 10/2006 | Gur |
| 2007/0111048 A1 | | 5/2007 | Rackey et al. |
| 2007/0245897 A1 | * | 10/2007 | Besecker et al. ................ 96/11 |
| 2007/0248503 A1 | * | 10/2007 | Boersma et al. ............. 422/129 |

FOREIGN PATENT DOCUMENTS

| | | |
|---|---|---|
| WO | WO-96/33794 | 10/1996 |
| WO | WO-00/69556 | 11/2000 |
| WO | WO-01/10775 | 2/2001 |
| WO | WO-02/087002 | 10/2002 |
| WO | WO-2006/041854 | 4/2006 |

OTHER PUBLICATIONS

U.S. Appl. No. 60/760,906.

Demin, et al., "Transfer phenomena in an electrochemical reactor based on mixed oxide conductor," Solid State Ionics I35, 2000.

Cui, et al., "$Gd_{0.2}Ce_{0.8}O_{1.9}$-$Y_{0.08}Sr_{0.88}Ti_{0.95}Al_{0.05}O_{3+\delta}$ Composite Mixed Conductors for Hydrogen Separation," Journal of the Electrochemical Society, 152, 2005.

Primdahl and Mogensen "Oxidation of Hydrogen on Ni/Yttria-Stabilized Zirconia Cermet Anodes", J. Electrocem. Society, vol. 144, p. 3409 (1997).

Mizusaki et al., "Kinetic Studies of the Reaction at the Nickel Pattern Electrode on YSZ in H2-H2O Atmospheres", Solid State Ionics, vol. 70/71, p. 52-58 (1994).

Gong et al., "Polarization Study on Dope Lanthanum Gallate Electrolyte Using Impedance Spectrscopy", Journal of Materials Engineering and Performance, vol. 13, No. 3, p. 274-281 (Jun. 2004).

Jiang et al., "The Electrochemical Performance of LSM/Zirconia Yttria Interface as a Function of A-site Non-Stoichiometry and Cathodic Current Treatment", Solid State Ionics, vol. 121 (1999).

Wang et al., "Electrocatalytic Properties of LSM-based Electrodes for Oxygen Reduction", J. Solid State Electrochemistry, vol. 6, p. 384 (2002).

Petric et al., "Evaluation of La-Sr-Co-Fe-O Perovskites for Solid Oxide Fuel Cells and Gas Separation Membranes", Solid State Ionics, vol. 135, p. 719 (2000).

Martinez-Frias et al, "A Natural Gas Assisted Steam Electrolyzer for High Efficiency Production of Hydrogen", Intl. J. of Hydrogen Energy, vol. 28(5), p. 483 (2003).

\* cited by examiner

COMPOSITE MIXED OXIDE IONIC AND ELECTRONIC CONDUCTORS FOR HYDROGEN SEPARATION

CROSS REFERENCE TO RELATED APPLICATIONS

This application claims the benefit of priority under 35 U.S.C. § 119(e) to co-pending U.S. Application No. 60/630,368, filed Nov. 23, 2004, which is hereby incorporated by reference.

STATEMENT OF GOVERNMENT SUPPORT

This invention was made with United States Government Support under Contract Number DE-FC26-03NT41958 awarded by the Department of Energy. The Government has certain rights to this invention.

BACKGROUND

Proton exchange membrane (PEM) fuel cells are fast approaching commercialization for application in the transportation, military and stationary sectors. One of the needs for the operation of a PEM fuel cell is that of high purity hydrogen with less than ~10 ppm of impurities such as CO. It is therefore expected that if PEM fuel cells are to have wide applications, an infrastructure to produce tonnage quantities of high purity hydrogen has to be available.

Presently tonnage hydrogen is produced by reformation of hydrocarbon fuel followed by the water gas shift reaction and pressure wing adsorption (PSA) of the $CO_2$. The major disadvantage of the current process especially in reference to PEM fuel cell application is that the purity levels that can be attained are low (80-90%). Impurities such as CO and $CH_4$ remain in the hydrogen which can poison the anodes of the PEM fuel cell.

Operation of an electrochemical reactor for production of hydrogen from synthesis gas or other reformate gases based on the membrane having mixed oxygen ion and electronic conductivity has been described. See, commonly owned International Published Application WO 03/089117, which is incorporated in its entirety by reference. The process, generally conducted at temperatures of approximately 800-1000° C., involves the use of a cell in which a mixture of reformate gas and steam are flowed on one side of a dense solid state ceramic membrane, while steam is passed on the other side. High purity hydrogen is generated on the steam side. The ceramic membrane is a mixed electronic and ionic conductivity (MEIC) membrane.

MIEC membranes have been used in oxygen separation including partial oxidation of methane (POX), oxidative coupling of alkanes to form alkenes, and oxygen separation from air for medical applications. Gas separation processes using MIEC membranes require membranes with high chemical stability and high ambipolar conductivity, i.e., applying equally to positive and negative charges. Complex oxide perovskites, $La_{1-x}Sr_xCo_yFe_{1-y}O_{3-\delta}$ (LSCF) and $La_{1-x}Ca_xFeO_{3-\delta}$ (LCF), have high ambipolar conductivities and oxygen surface exchange coefficients, and are excellent candidate materials as oxygen separation membranes. However, most of the targeted membrane separation applications for LSCF and LCF involve relatively high oxygen partial pressure ($10^{-4}$ to 1 atm). Under such conditions these perovskites are quite stable. LSCF and LCF are not expected to retain their chemical and structural stability at lower oxygen partial pressures.

An important requirement for MIEC gas separation membranes is that they remain chemically and structurally stable under the operating conditions that exist on both sides of the membrane in gas separation processes. Recent work on LSCF and LCF systems demonstrate that LSCF and LCF perovskites do not possess the requisite chemical stability to function as membrane separators in all processes and in particular in hydrogen separation processes including reformate gases where the oxygen partial pressure can be quite low.

SUMMARY

A stable materials system capable of functioning as a gas separation membrane is described. The material system includes of a dual-phase, chemically compatible composite membrane that exhibits stability under highly reducing atmospheres. In one aspect, the membrane is used in a process and material system that allows for the highly efficient separation of hydrogen using a mixed ionic and electronic conducting membrane.

In one aspect of the invention, a mixed ionic and electronic conducting membrane includes a two-phase solid state ceramic composite, wherein the first phase includes an oxygen ion conductor and the second phase includes an n-type electronically conductive oxide, wherein the electronically conductive oxide is stable at an oxygen partial pressure less than about $10^{-7}$ atm and has an electronic conductivity of at least 1 S/cm.

In another aspect of the invention, a hydrogen purification system is provided. The system includes a source of reforming gas, a source of steam, a flow cell including a first oxidizing compartment and a second reducing compartment separated by a two-phase solid state ceramic membrane, wherein the first phase includes an oxygen ion conductor and the second phase includes an n-type electronically conductive oxide, wherein the electronically conductive oxide is stable at an oxygen partial pressure less than about $10^{-7}$ atm and has an electronic conductivity of at least 1 S/cm, a conduit for directing the reforming gas across the membrane in the first compartment, a conduit for directing the steam across the membrane in the second compartment; and a condenser downstream from the second compartment for separating steam from hydrogen.

In one or more embodiments, the electronically conductive oxide includes an n-type semiconductor, or the electronically conductive oxide includes a donor-doped perovskite, for example, a donor-doped strontium titanate, or the electronically conductive oxide is selected from the group consisting of donor-doped indium oxides and donor-doped tin oxides. In one or more embodiments, the donor-doped strontium titanate has the formula $R_xSr_{1-x}Ti_{1-y}R'_yO_{3-\delta}$, wherein R is a rare earth or alkaline earth element, R' is Al, x is in the range of about 0.01 to 0.5 and Y is in the range of about 0 to 0.2.

In one or more embodiments, the membrane is stable at an oxygen partial pressure in the range of $10^{-7}$-$10^{-20}$ atm, or at an oxygen partial pressure in the range of $10^{-16}$-$10^{-20}$ atm.

In one or more embodiments, the oxygen ion conductor includes a mixed metal oxide having a fluorite structure, for example, selected from the group consisting of rare earth doped ceria, rare earth doped zirconia, rare earth doped thoria, rare earth doped hafnia and alkaline earth doped lanthanum gallium oxide.

In one or more embodiments, the membrane has a thickness of about 1 μm to 3 mm.

In one or more embodiments, the volume ratio of first phase to second phase is in the range of from about 20:80 to about 80:20, or in the range of from about 40:60 to about 60:40.

In one or more embodiments, the first phase forms a percolative path in the composite and/or the second phase forms a percolative path in the composite.

In one or more embodiments, the membrane is stable at a temperature greater than about 500° C., at a temperature in the range of 700-1000° C., or in the presence of steam.

The dual phase membrane can separate hydrogen with purity levels close to 100%. This novel membrane system operates at temperatures up to 1000° C., e.g., around 900° C., and it is expected to perform well under conditions similar to those currently used in standard reforming operations. The membrane system has been illustrated utilizing syngas as a feed but the process and materials are anticipated to be capable of operating with a wide variety of other reformate gases including unreformed hydrocarbons such as methane.

The dual phase membrane materials system and related methods offer great promise in providing alternative solutions to many of the issues being faced by developers of hydrogen separation systems: production of high hydrogen fluxes, low membrane cost and chemical stability during operation.

BRIEF DESCRIPTION OF THE DRAWING

The invention is described with reference to the following figures that are provided for the purpose of illustration only, and are not to be interpreted as limiting the invention, the full scope of which is set forth in the claims that follow.

DETAIL DESCRIPTION

Figure 1:
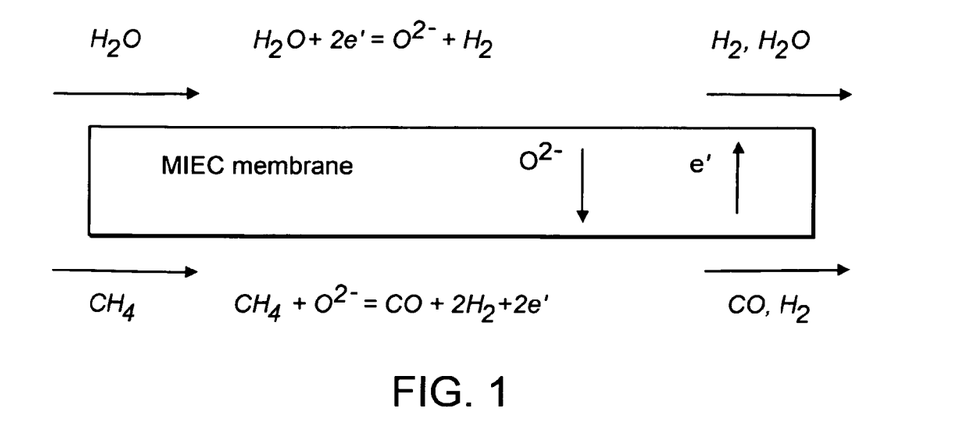
FIG. 1 is a schematic illustration of a membrane hydrogen separation using an oxygen ion and electron conducting MIEC membrane.

A process that utilizes oxygen ion and electron (or hole) conducting MIEC membranes for synthesizing and separating hydrogen is shown in FIG. 1. This process involves reacting methane (or reformate gas) with steam in a membrane reactor to form synthesis gas (a mixture of CO and $H_2$) on one side of the membrane and a hydrogen-steam mixture rich in hydrogen on the other side of the membrane. In this process the MIEC membrane is subjected to high water vapor content and moderate oxygen partial pressure ($p_{O2} \sim 10^{-7}$ to $10^{-11}$ atm) on the steam side. The exact $p_{O2}$ depends on the local $H_2O$ to $H_2$ ratio. The other side of the membrane exposed to reformate gases will have a low $p_{O2}$ ($10^{-16}$ to $10^{-20}$ atm). Oxygen diffuses across the membrane through coupled transport of oxygen ions and electrons/holes from the steam-rich side to the methane/reformate side until the chemical potential gradient of neutral $O_2$ across the membrane is dissipated.

Electroneutrality is preserved in the case of transfer of oxygen ions and electrons when the transfer of oxygen ions is opposite in direction to transfer of electrons. In the case of oxygen ions and electron-holes, transfer of both species is in the same direction to preserve electroneutrality. If the hydrogen purification reaction is reconfigured, with steam being used on both sides of the membrane (i.e. mixtures of syn gas (or other hydrocarbon reformate) and steam on one side and pure steam on the other side), the reactions are:

On the reformate gas side:

$$CO+O^{2-} \rightarrow CO_2+2e^-$$

$$H_2+O^{2-} \rightarrow H_2O+2e-$$

$$CH_4+O^{2-} \rightarrow CO+2H_2+2l^-$$

On the steam side:

$$H_2O+2e- \rightarrow H_2+O^{2-}$$

Oxygen ions formed through dissociation of steam through absorption of two electrons on the steam side transport to the syn-gas side where they combines with carbon monoxide and hydrogen in the syn gas to form carbon dioxide and steam and liberate two electrons. Reaction of the transported oxygen ions with methane can also occur to form carbon monoxide and hydrogen. The liberated electrons transport through the same membrane in the opposite direction to the steam side to participate in the steam dissociation reaction. The gases exiting the steam side of the membrane contain a mixture of hydrogen and remnant water vapor. The water vapor present in this stream can be condensed to result in a stream of pure hydrogen. Further, if the steam formed on the reformate gas side is continuously condensed to a level where carbon deposition does not occur in the membrane reactor, the reaction is forced to the right, resulting in a higher conversion of the reformate gas to hydrogen.

A suitable membrane system for hydrogen separation exhibits one or more of the following characteristics: high hydrogen flux, good oxygen flux, good mechanical stability, good chemical stability regardless of the type of feed used, e.g., natural gas, propane, ethyl alcohol, biofuels vs. coal-derives syngas and low temperature of operation. Suitable MIEC membranes used here are thermally and chemically stable under conditions typically encountered in membrane separation of hydrogen, i.e., $p_{O2}$ in the range of about $10^{-7}$-$10^{-20}$ or about $10^{-16}$-$10^{-20}$ on at least one side of the membrane and temperatures generally above 500° C., usually about 700-1000° C. In one or more embodiments, both the high oxygen ion conductive phase and the high electronic conductive phase of the MIEC membrane system are individually stable in the gas atmospheres and temperatures prevailing on both sides of the membrane during the hydrogen separation process. These membranes are typically gas impermeable and separate components on the basis of ionic conductivity characteristics, not on the basis of molecular size. Their thickness generally ranges from about 1 μm to about 3 mm.

In one or more embodiments, the membrane includes an oxygen ion conducting phase having a high oxygen ion conductivity. The oxygen ion conducting phase may have, but is not required to have, a low electronic conductivity of about 0.01 S/cm to about 1.0 S/cm, or about 0.01 S/cm to about 0.2 S/cm. In one or more embodiments, the membrane includes an electronic phase having a high electronic conductivity, e.g., greater than about 1.0 S/cm or about 5 S/cm to about 100 S/cm, or about 10 S/cm to 30 S/cm. The electronically conducting phase may have, but is not required to have, a low ion conductivity. The electronic conductivity is not the limiting transport factor in the membrane.

In one or more embodiments, the oxygen ion conducting phase and the electronically conducting phase are chemically compatible with each other, i.e., there is little or no solid state reactions between the two phases and at least no solid state reaction that is detrimental to conductivity. In one or more embodiments, the volume ratio of first oxygen ion conducting phase to second electronically conducting phase ranges from about 20:80 to about 80:20, or from about 40:60 to 60:40. In one or more embodiments, the dual phase composite forms a percolative path of one or both of the first ion conducting phase and the second electronic conducting phase. Thus it is possible to tailor the stability and ambipolar conductivity of composite MIECs by carefully choosing the relative volume fractions of the ionic and electronic conducting phases.

Several oxygen ion conductors with high ionic conductivity and excellent stability over a range of oxygen partial pressures are known. Suitable oxygen ion conducting materials or phases are solid solutions (i.e., solid "electrolytes") formed between oxides containing divalent and trivalent cations such as alkaline earth oxides, e.g., calcium oxide, or rare earth oxides, e.g., scandium oxide, yttrium oxide, lanthanum oxide, etc., and oxides containing tetravalent cations such as zirconia, hafnia, thoria and ceria. The oxygen ion-conducting materials or phases may be an oxygen ion conductive mixed metal oxide having a fluorite structure. The oxygen ion conducting material may be a doped fluorite compound. The higher ionic conductivity is believed to be due to the existence of oxygen ion site vacancies. One oxygen ion vacancy occurs for each divalent or each two trivalent cations that are substituted for a tetravalent ion in the lattice.

Any of a large number of oxides such as rare earth doped zirconia-, ceria-, hafnia-, or thoria-based materials may be used. Some of the known solid oxide transfer materials include $Y_2O_3$-stabilized $ZrO_2$, CaO-stabilized $ZrO_2$, $Sc_2O_3$-stabilized $ZrO_2$, $Y_2O_3$-stabilized $CeO_2$, CaO stabilized CeO, GaO-stabilized $CeO_2$, $ThO_2$, $Y_2O_3$-stabilized $ThO_2$, or $ThO_2$, $ZrO_2$, $CeO_2$, or $HfO_2$ stabilized by addition of any one of the lanthanide oxides or CaO. Additional examples include strontium- and magnesium-doped lanthanum gallate (LSGM). Many other oxides are known which have demonstrated oxygen ion-conducting ability which could be used in the multi-phase mixtures, and they are included in the present concept. The electronically conducting phase is typically an n-type conductive oxide. In other embodiments, the electronically conducting phase is an n-type oxide semiconductor. N-type oxide conductors typically have high electronic conductivity in reducing atmospheres and thus are expected to exhibit electronic conductivity under the reducing conditions experienced during hydrogen separation. N-type conductors, in particular, n-type oxide semiconductors, typically show an increase in electronic conductivity as the oxygen partial pressure is reduced.

Donor-doped perovskites, which are n-type semiconductors, can be used as the electronic conductor at lower oxygen partial pressures. Donor-doped perovskites have high n-type conductivity under reducing conditions and also possess excellent chemical stability over a range of reducing $p_{O2}$ values expected to prevail in the process shown in FIG. 1.

Mixed metal oxides having a perovskite structure (at operating temperatures) can have very good electronic conductivity. The term "perovskites" refers to a class of materials which have a structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of the cube's edges. This is referred to as an $ABO_3$-type structure, in which A and B represent metal ions.

In one or more embodiments, the donor-doped perovskite is a donor-doped strontium titanate. The donor-doped strontium titantate may be doped at the Sr site with trivalent ions such as Gd, Y, La, Nd, Al and the like. In other embodiments, the donor doped strontium titanate has the formula $R_xSr_{1-x}Ti_{1-y}R'_yO_{3-\delta}$, wherein R is a rare earth, e.g., Y, Sm, Yb, Sc, La, Gd, or Nd, R' is Al, x is in the range of 0.01 to 0.5 and Y is in the range of 0 to 0.2. In one or more embodiments, the electronically conductive can be donor-doped indium oxides or donor-doped tin oxides, e.g., rare earth doped tin oxides and indium oxides.

In one or more embodiments, a dual phase membrane includes an oxygen ion conductor such as a rare earth doped ceria, e.g., $RE_2O_3$—$CeO_2$, where RE is a rare earth metal, e.g., Y, Gd, Sm, La, Yb, etc., and an n-type electronic conductor such as donor doped strontium titanate, e.g., $R_xSr_{1-x}TiO_{3-\delta}$, where R is a trivalent ion doping for Sr such as Gd, Y, La, Nd, Al etc. An exemplary dual phase composite includes gadolinia-doped ceria (GDC) as the oxygen ion conductor and yttrium and aluminum doped strontium titanate (YSTA) or gadolinium and aluminum doped strontium titanate (GSTA) as the n-type electronic conductor. A specific embodiment includes an ionic conductor of GDC ($Gd_{0.2}Ce_{0.8}O_{1.9}$) and an electronic conductor of YSTA ($Y_{0.08}Sr_{0.88}Ti_{0.95}Al_{0.05}O_{3\pm\delta}$). A second specific embodiment includes an ionic conductor of GDC ($Gd_{0.2}Ce_{0.08}O_{1.9}$) and an electronic conductor of GSTA ($Gd_{0.08}Sr_{0.88}Ti_{0.95}Al_{0.05}O_{3\pm\delta}$).

Both YSTA, GSTA and GDC are individually very stable in the gas atmospheres expected to prevail on the two sides of the membrane in the process. However, YSTA (or GSTA) is a predominant electronic conductor and GDC is a predominant ionic conductor. Thus, a composite made of YSTA (or GSTA) and GDC (or other exemplary materials described herein) with contiguous grains of both phases is expected to form an MIEC membrane with high ambipolar conductivity suitable for oxygen separation application to generate hydrogen, in the process illustrated schematically in FIG. 1, provided these two phases are chemically inert to each other. Further, composite MIEC membranes offer tailorability of ambipolar conductivity within the percolation regime. The thermal expansion coefficient (TEC) of yttrium-doped $SrTiO_3$ is about 11-12 ppm/° C. and is very closely matched with that of GDC with a TEC of ~12 ppm/° C. Thus, no cracking of samples due to TEC mismatch is expected to occur during the thermal cycling of the dense composite samples.

Figure 2:
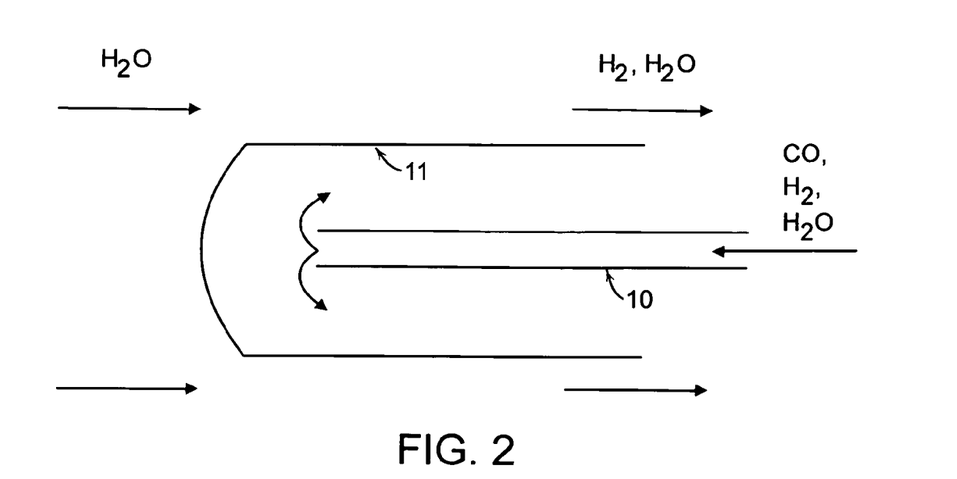
FIG. 2 is a schematic illustration of an apparatus for hydrogen separation according to one or more embodiments of the invention.

It should be noted that the membrane used for hydrogen purification can be in any shape. One particularly convenient shape is shown in FIG. 2, which is tubular, with one end of the tube being closed. A tube 10 with a smaller diameter (made of any ceramic material that is conveniently available, for example alumina) than the membrane is inserted into the membrane 11 and carbon monoxide, hydrogen and steam are fed into the membrane. Water vapor is passed over the second side of the membrane.

Note that the membranes used are generally bi-directional and that transfer of a component across the membrane is a function of concentration of that component on both sides of the membrane. As a result, a variation of FIG. 2, with steam passing into the inner tube (and passing over the insider of the membrane) and syn gas (or methane or other hydrocarbon) passing over the outside of the membrane, is also possible.

Figure 3:
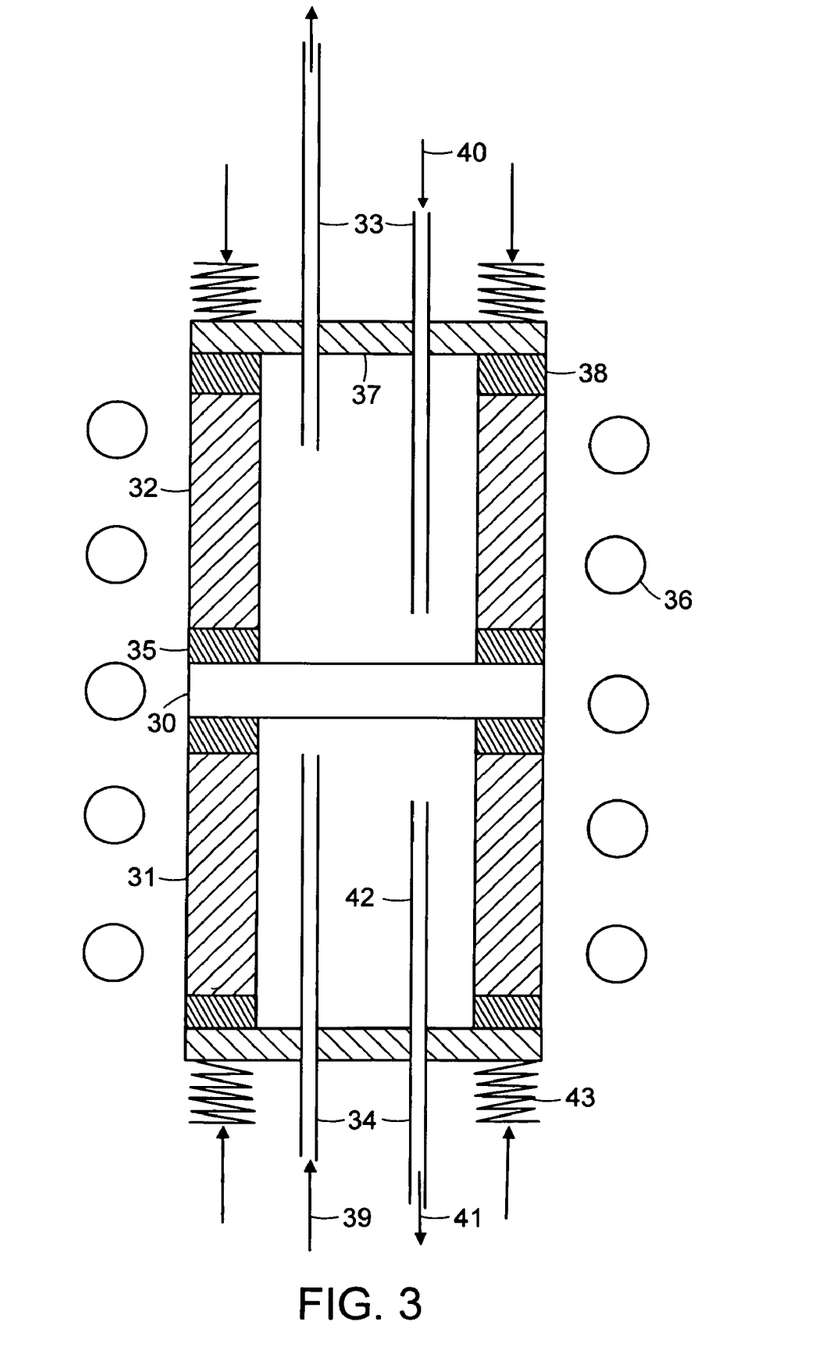
FIG. 3 is a schematic illustration of a small-scale apparatus for conducting a hydrogen separation according to one or more embodiments of the invention.

A larger scale apparatus is shown in FIG. 3. The membrane 30 is sealed between cut ends of two alumina tubes (31 and 32). Between the membrane and the ends of the tubes is placed an o-ring 35 for sealing the membrane to the tubes. This frequently is a gold o-ring that melts and forms the seal. A smaller diameter tubes 33 is inserted into the reformate gas side of the membrane (which is closed from the atmosphere with a stainless steel manifold 37) to carry the reformate gas to the membrane, while the purified hydrogen gas is removed from the opposite side of the membrane via another tubes 34. The entire apparatus is heated to 800-1000 C with furnace heating elements 36.

A larger scale apparatus for hydrogen purification is very similar to that used for oxygen purification, as shown in Schwartz, U.S. Pat. No. 6,033,632.

Syn gases for use in the generation of purified hydrogen are generated by the partial oxidation of methane (also known as the POX reaction).

$CH_4 + (½)O_2 \rightarrow CO + H_2$ (POX)

Alternatively, syn gases can be generated by using the steam methane reformation (SMR) process, in which the following reaction takes place:

$CH_4 + H_2O \rightarrow CO + 3H_2$ (SMR)

Although most of the discussion herein relates to the reformate containing carbon monoxide plus hydrogen, this process also applies to these mixtures that contain other by-products from the partial oxidation or steam reformation of methane. Furthermore, the process can be used with mixtures of carbon monoxide and hydrogen containing small quantities of other hydrocarbons or hydrocarbon reformate or inert gases such as Ar, He or nitrogen. In addition, the process also applies to the partial oxidation or steam methane reformation products of other hydrocarbons (such as propane, butane, octane, or mixtures thereof). The process is also applicable to the products of carbon dioxide reformation of hydrocarbons and autothermal reformation of hydrocarbons (including methane). Mixtures of any two or more of the above gases can also be used.

The gases used in this process as a source of hydrogen can be not only syn gas, but also (1) any gaseous mixtures containing hydrogen gas such as methane, methanol, ethanol or other hydrocabons, (2) similar materials not in a gaseous state at room temperature but which can be converted to a gaseous state at the temperature and pressure at which the separation takes place, and (3) any mixtures thereof.

Experimental

Powder synthesis, pelletfabrication, and characterization. GDC and YSTA powders were synthesized by conventional powder processing using $Gd_2O_3$, $CeO_2$, $Y_2O_3$, $SrCO_3$, $TiO_2$, and $Al_2O_3$ (Alfa Aesar) as precursor materials. The GDC and YSTA powders were prepared by calcination of stoichiometric mixtures of precursor materials at 1300° C. for 4 h. The calcined products were then finely ground for 24 h using a ball mill. The mean particle size of the milled powders was 2 and 4 μm for the GDC and YSTA phases, respectively, as evaluated using a Horiba LA-910 laser light scattering analyzer. The fine powders were then mixed in the volume ratio of 40% GDC-60% YSTA based on the density values of GDC and YST available in the literature. The particulate composite mixture was then milled in methanol for 24 h and then dried to remove the organics.

The dried composite mixture was pressed into a disk 35 mm diameter and 2.5 mm thick at a pressure of about 500 kg/cm². The disk was first sintered in air at 1500° C. for 4 h, cooled, and then resintered in a reducing atmosphere at an oxygen partial pressure of $10^{-18}$ atm at 1400° C. for 4 h. The heating and cooling rates for the sintering steps were fixed at 5° C./min. The density of the sintered pellet was 5.99 g/cm³, which is close to the calculated density of 6.00 g/cm³ using the theoretical densities of GDC and doped $SrTiO_3$.

Figure 4:
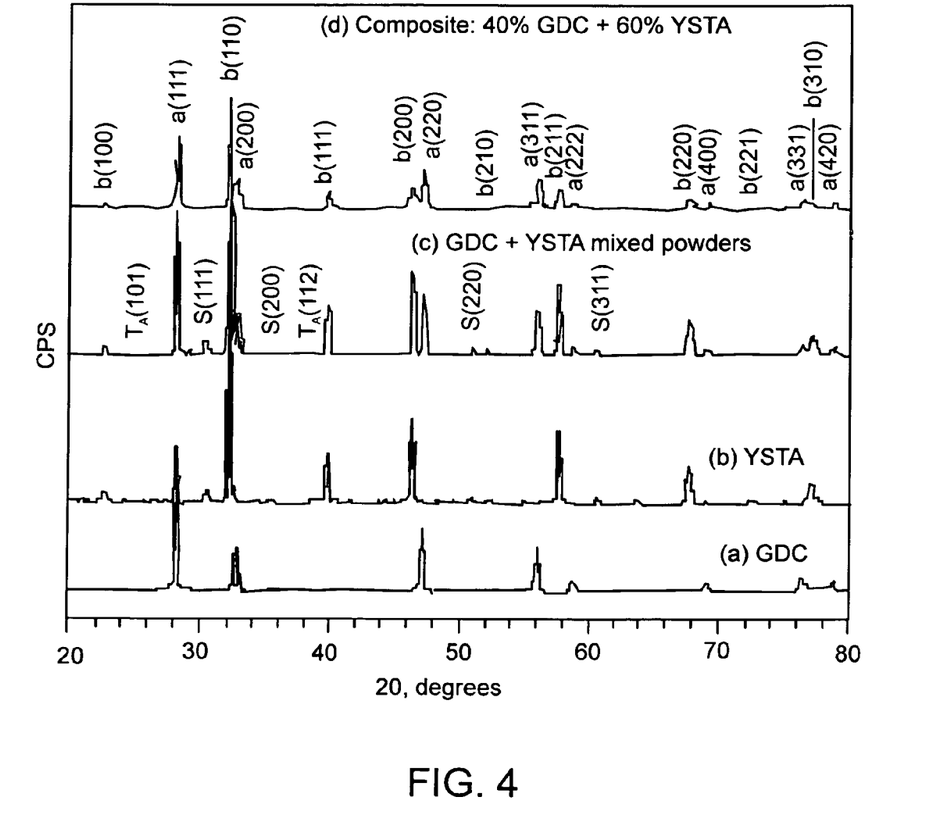
FIG. 4 displays the XRD pattern of (a) gadolinium doped ceria (GDC), (b) yttrium and aluminum doped strontium titanate (YSTA), (c) a physical mixture of GDC and YSTA and (d) a sintered composite of GDC and YSTA.

The composite phase stability was determined by X-ray diffraction (XRD) analysis (using a Rigaku 18KW diffractometer with Cu Ka radiation (copper anode)) as is shown in FIG. 4. In this figure, trace (a) and trace (b) are XRD traces obtained from single phase powders of GDC and YSTA, trace (c) is the XRD trace of a physical mixture of GDC and YSTA, and trace (d) is a sintered composite of GDC and YSTA. The traces and in particular, trace (d), show that the GDC and YSTA phases retain their original fluorite and perovskite structures, respectively, and do not form any derivative phases. Thus, GDC and YSTA do not react with each other and a fine GDC/YSTA composite is obtained.

Figure 5:
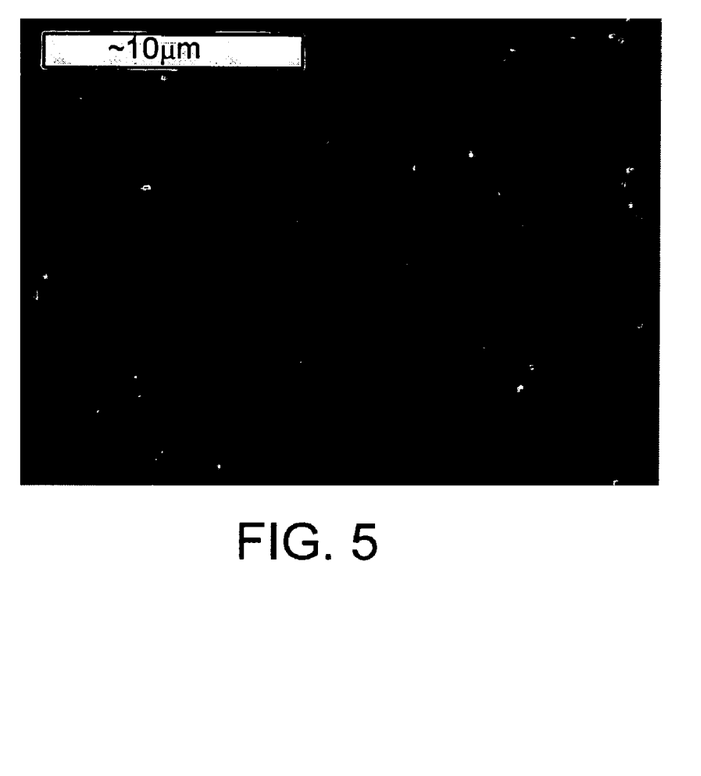
FIG. 5 is an SEM micrograph of a polished surface of a GDC/YSTA composite according to one or more embodiments of the present invention.

An SEM image of the polished surface of the composite membrane sintered in air at 1500° C. for 4 h and subsequently resintered under reducing conditions at 1400° C. for 4 h at an oxygen partial pressure of less than $10^{-18}$ is shown in FIG. 5. The grain sizes are in the range of 3-6 μm, which plays a positive role in conductivity. The small grain size provides good mechanical properties, while the large grain boundaries are not good for conductivity. The two phase materials are well-percolated, which is important from the standpoint of achieving high ambipolar conductivity.

Figure 6:
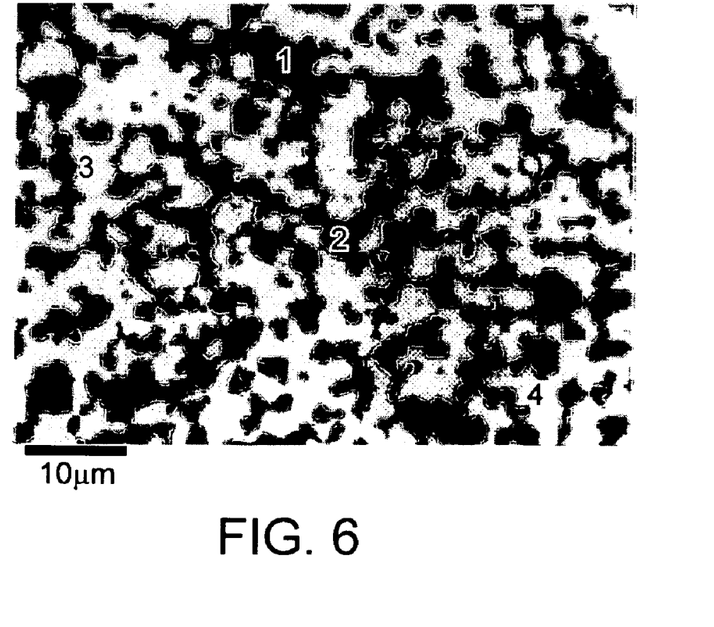
FIG. 6 is a wavelength dispersive spectrum (WDS) of a polished surface of a GDC/YSTA composite according to one or more embodiments of the invention.

Elemental composition of the pellet was determined using wavelength dispersive spectrometers (WDS) on an electron microprobe. In FIG. 6, four locations within the sample where the composition was measured using WDS are shown. Points 1 and 3 are located within the YSTA system and points 2 and 4 are located within the GDC system. The WDS results for GDC and YSTA phases in the composite sample indicated good agreement between intended and experimentally determined compositions. However, the measured composition inside the grains suggested some interdiffusion of rare-earth elements (Gd, Y) across the two-phase boundaries. Y and Gd are both trivalent rare-earth cations with closely matched ionic radii. The interdiffusion is not expected to have a significant detrimental effect on the transport properties of the composite.

In another example, a Gd-doped $SrTiO_3$ (GSTA) was incorporated instead of YSTA as the electronic conductor in the dual-phase composite. The WDS results for the single phase GSTA and the GDC+GSTA composite showed good agreement between the intended and experimentally measured compositions, indicating good compositional stability. The electronic properties of the material are expected to be comparable to that of a GDC/YSTA composite.

Electrical conductivity and conductivity relaxation. The electrical conductivity of the dual-phase composites was measured by the standard four-probe dc method. A densified pellet of the sample was cut and polished to a rectangular bar shape of approximate dimensions 30×3×3 mm. The ends of the bar sample were coated with platinum paste (Engelhard), and pure platinum wires were used as current and voltage leads. The MIEC sample and YSZ sensor were loaded in a narrow alumina tube. Both sides of the alumina tube were sealed using pipe fittings with O-rings. The tube was heated in a furnace assembly. The sample was first allowed to equilibrate at a fixed $p_{O2}$ and temperature, and the total conductivity of the equilibrated sample was measured in a galvanodynamic mode using a Solartron electrochemical system.

Figure 7:
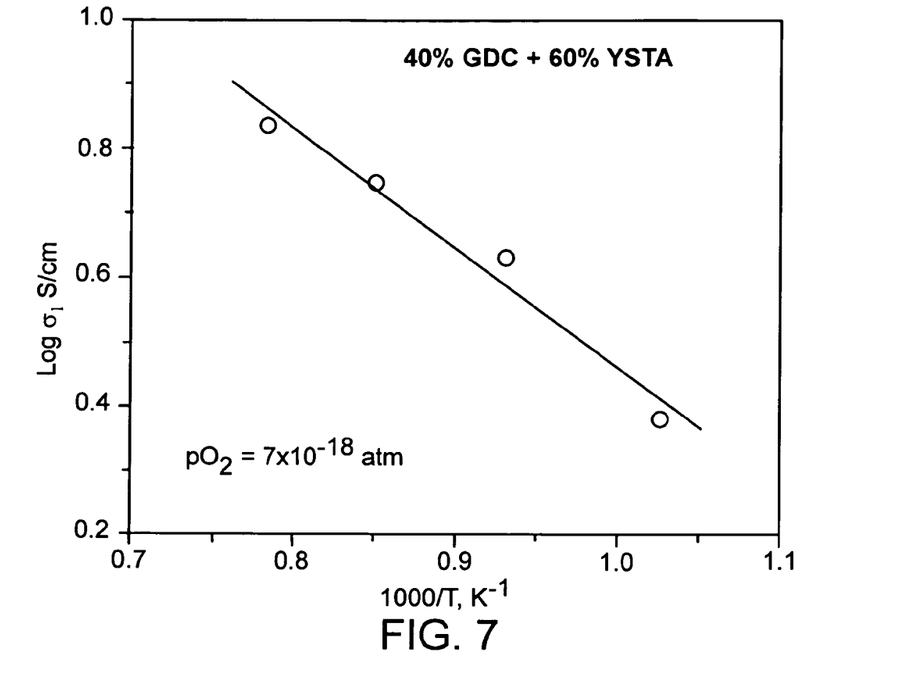
FIG. 7 is an Arrhenius plot of the total conductivity of a GDC/YSTA composite in a reducing environment ($7 \times 10^{-18}$ atm $O_2$).

The electrical conductivity in a reducing atmosphere having a partial pressure of less than $10^{-16}$ atm $O_2$ was measured. Because YSTA is an n-type conductor its conductivity in air is very low. When annealed in a reducing atmosphere, oxygen vacancies and electron formation occurs. The conductivity of the GDC+YSTA composite as a function of temperature is reported in FIG. 7 at a constant $p_{O2}$ of $7\times10^{-18}$ atm. The total electrical conductivity of the composite at 900° C. and at $p_{O2}$ of $7\times10^{-18}$ atm is 5.6 S/cm. The individual conductivities of YSTA and GDC in the composite are ca. 20 S/cm and ca. 1.0 S/cm, respectively. The total conductivity is dominated by the electronic conductivity of YSTA, and oxygen permeation (and thus hydrogen separation) through the dual-phase composite membranes can be rate controlled by oxygen transport through the composite in the bulk and surface exchange reactions at the gas-composite interface.

Figure 8:
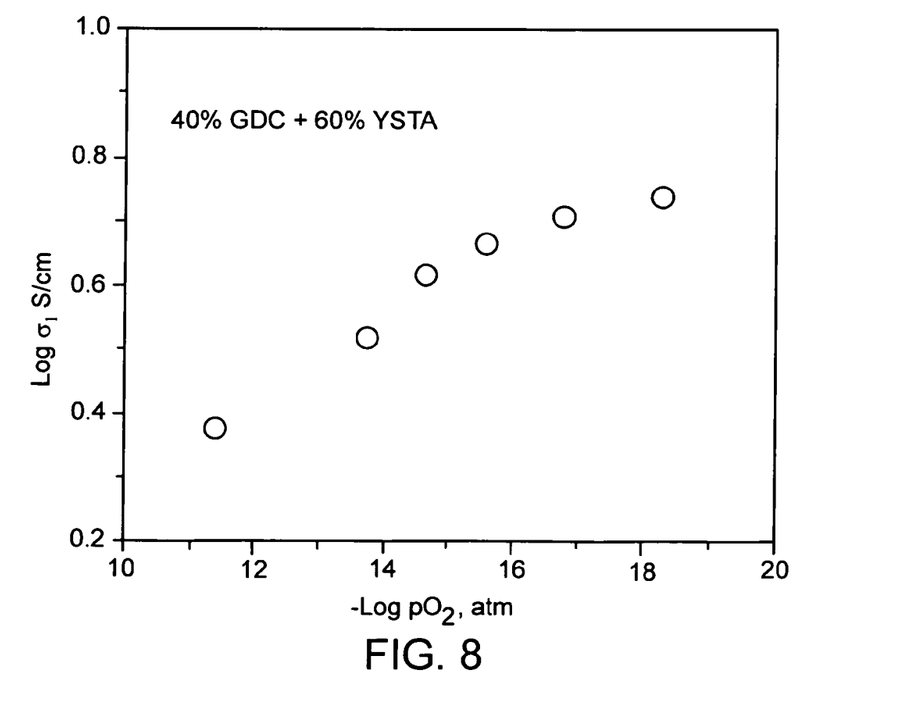
FIG. 8 shows the total conductivity of a GDC/YSTA composite membrane over a range of oxygen partial pressures.

FIG. 8 shows the total conductivity of the composite membrane over a range of oxygen partial pressures. The membrane materials exhibits a total conductivity in the range of 2-6 S/cm over a range of oxygen partial pressures that prevail during the hydrogen gas separation process. The large measured values for the oxygen chemical diffusion coefficient at lower oxygen partial pressures indicate that the two phases are percolative. Further, the ionic conductivity of GDC at the high oxygen partial pressures (ca $10^{-10}$ atm) is about 0.2 S/cm. However, the measured total conductivity is about 2 S/cm under these conditions and a large portion of the total conductivity is electronic conductivity from the YSTA phase. These observations taken together suggest that the ambipolar conductivity at the higher end of oxygen partial pressure range of interest will be sufficiently high to maintain high rates of oxygen permeation.

During the conductivity relaxation experiment, the sample was initially equilibrated in one atmosphere ($p'_{O2}$) and the conductivity of the sample was recorded in 10 s intervals in a galvanostatic scan. The atmosphere surrounding the sample was then abruptly changed to a new atmosphere ($p''_{O2}$). The change in oxygen partial pressure ($p'_{O2}-p''_{O2}$) was kept within two orders of magnitude in order to determine the chemical diffusion coefficient and the surface exchange coefficient as a continuous function of $p_{O2}$. The $p_{O2}$ was continuously monitored by the YSZ sensor, and a total gas flow of 300 cm$^3$/min was used. About 90% of the change in oxygen partial pressure ($p'_{O2} \leftrightarrows p''_{O2}$) in the sample chamber was achieved in the first 5 to 10 s. The remaining 10% change occurred over a 100-200 s time interval depending on temperature, $p_{O2}$, chamber size, and total gas flow. The conductivity transient was recorded until the sample was completely equilibrated to the new $p_{O2}$. The measurement was repeated by switching the gas composition back to $p'_{O2}$ from $p''_{O2}$.

Figure 9:
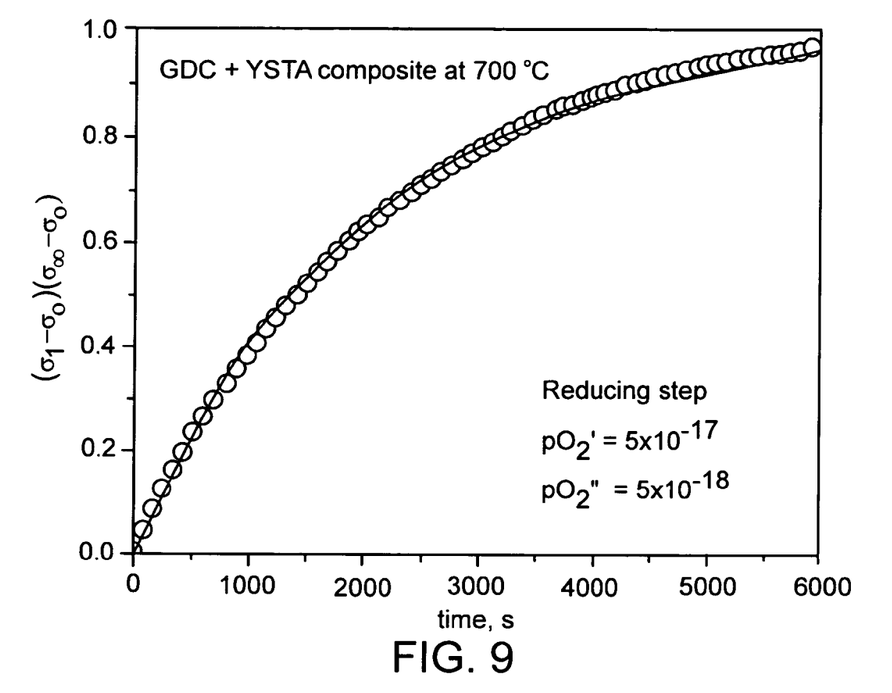
FIG. 9 is a plot of a typical conductivity relaxation transient for a GDC/YSTA composite material according to one or more embodiments.
Figure 10:
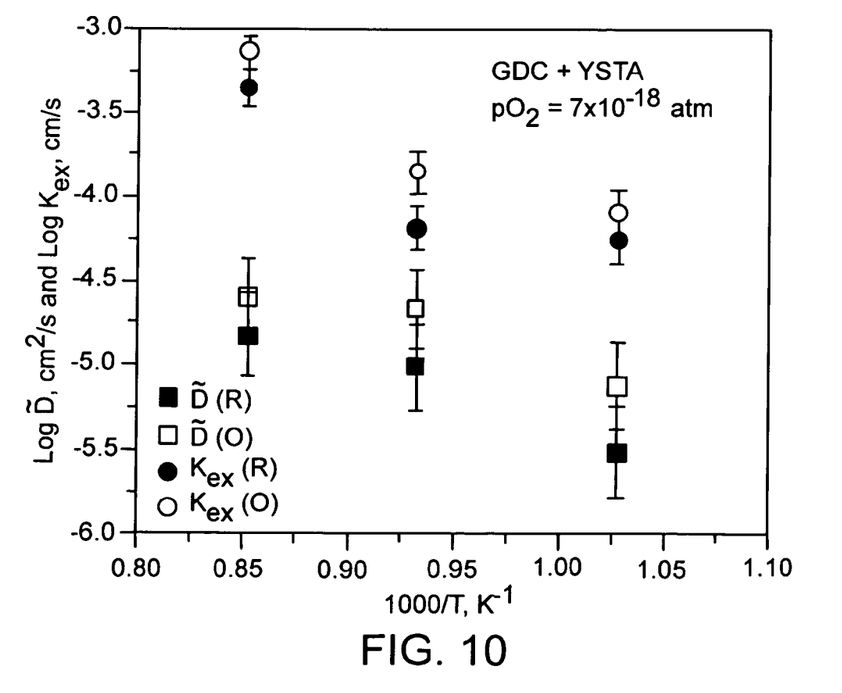
FIG. 10 is an Arrhenius plot for $D$ and $K_{ex}$ for a GDC/YSTA composite material according to one or more embodiments under reducing conditions.

The electrical conductivity relaxation technique is used in solid-state electrochemistry to measure species chemical diffusion and surface exchange coefficients. A typical relaxation curve is shown in FIG. 9, where the circles are experimentally determined and the dotted line is a fitted curve. The data were obtained as described above. Arrhenius plots of $\mathrm{D}$ (chemical diffusion coefficient) and $K_{ex}$ (surface exchange coefficient) are shown in FIG. 10. At a temperature of 900° C., which is an exemplary application temperature, $\mathrm{D}$ and $K_{ex}$ have values around $10^{-5}$ cm$^2$/s and $10^{-4}$ cm/s, respectively. Thus, the chemical diffusion coefficient and surface exchange coefficient are similar in magnitude to single phase perovskites such as LSCF and LCF under oxidizing conditions.

What is claimed is:

1. A mixed ionic and electronic conducting membrane, comprising:
   a two-phase solid state ceramic composite,
   wherein the first phase comprises an oxygen ion conductor and the second phase comprises a donor-doped, n-type electronically conductive oxide, wherein the electronically conductive oxide is stable at an oxygen partial pressure less than about $10^{-7}$ atm and has an electronic conductivity of at least 1 S/cm.

2. The membrane of claim 1, wherein the electronically conductive oxide comprises an n-type semiconductor.

3. The membrane of claim 1, wherein the membrane is stable at an oxygen partial pressure in the range of $10^{-7}$-$10^{-20}$ atm.

4. The membrane of claim 1, wherein the membrane is stable at an oxygen partial pressure in the range of $10^{-16}$-$10^{-20}$ atm.

5. The membrane of claim 1, wherein the oxygen ion conductor is selected from the group consisting of rare earth doped ceria, rare earth doped zirconia, rare earth doped thoria, rare earth doped hafnia and alkaline earth doped lanthanum gallium oxide.

6. The membrane of claim 1, wherein the oxygen ion conductor comprises a mixed metal oxide having a fluorite structure.

7. The membrane of claim 1, wherein the electronically conductive oxide comprises a donor-doped perovskite.

8. The membrane of claim 5, wherein the electronically conductive oxide comprises a donor-doped perovskite.

9. The membrane of claim 1, wherein the electronically conductive oxide is selected from the group consisting of donor-doped indium oxides and donor-doped tin oxides.

10. The membrane of claim 1, wherein the electronically conductive oxide comprises donor-doped strontium titanate.

11. The membrane of claim 10, wherein the donor-doped strontium titanate comprises $R_xSr_{1-x}Ti_{1-y}R'_yO_{3-\delta}$, wherein R is a rare earth or alkaline earth element, R' is Al, x is in the range of about 0.01 to 0.5 and Y is in the range of about 0 to 0.2.

12. The membrane of claim 1, wherein the membrane has a thickness of about 1 µm to 3 mm.

13. The membrane of claim 1, wherein the volume ratio of first phase to second phase is in the range of from about 20:80 to about 80:20.

14. The membrane of claim 1, wherein the volume ratio of the first phase to the second phase is in the range of from about 40:60 to about 60:40.

15. The membrane of claim 1, wherein the first phase forms a percolative path in the composite.

16. The membrane of claim 1, wherein the second phase forms a percolative path in the composite.

17. The membrane of claim 1, wherein the membrane is stable at a temperature greater than about 500° C.

18. The membrane of claim 1, wherein the membrane is stable at a temperature in the range of 700-1000° C.

19. The membrane of claim 1, wherein the membrane is stable in the presence of steam.

20. A hydrogen purification system, comprising:
   a source of reforming gas;
   a source of steam;
   a flow cell comprising a first oxidizing compartment and a second reducing compartment separated by a two-phase solid state ceramic membrane, wherein the first phase comprises an oxygen ion conductor and the second phase comprises a donor-doped n-type electronically conductive oxide, wherein the electronically conductive oxide is stable at an oxygen partial pressure less than about $10^{-7}$ atm and has an electronic conductivity of at least 1 S/cm;

a conduit for directing the reforming gas across the membrane in the first compartment;

a conduit for directing the steam across the membrane in the second compartment; and a condenser downstream from the second compartment for separating steam from hydrogen.

21. The system of claim 20, wherein the electronically conductive oxide comprises an n-type semiconductor.

22. The system of claim 20, wherein the membrane is stable at an oxygen partial pressure in the range of $10^{-7}$-$10^{-20}$ atm.

23. The system of claim 20, wherein the membrane is stable at an oxygen partial pressure in the range of $10^{-16}$-$10^{-20}$ atm.

24. The system of claim 20, wherein the oxygen ion conductor is selected from the group consisting of rare earth doped ceria, rare earth doped zirconia, rare earth doped thoria, rare earth doped hafnia and alkaline earth doped lanthanum gallium oxide.

25. The system of claim 20, wherein the oxygen ion conductor comprises a mixed metal oxide having a fluorite structure.

26. The system of claim 20, wherein the electronically conductive oxide comprises a donor-doped perovskite.

27. The system of claim 25, wherein the electronically conductive oxide comprises a donor-doped perovskite.

28. The system of claim 20, wherein the electronically conductive oxide is selected from the group consisting of donor-doped indium oxides and donor-doped tin oxides.

29. The system of claim 20, wherein the electronically conductive oxide comprises donor-doped strontium titanate.

30. The system of claim 29, wherein the donor-doped strontium titanate comprises $R_xSr_{1-x}Ti_{1-y}R'_yO_{3-\delta}$, wherein R is a rare earth or alkaline earth element, R' is Al, x is in the range of about 0.01 to 0.5 and Y is in the range of about 0 to 0.2.

31. The system of claim 20, wherein the membrane has a thickness of about 1 μm to 3 mm.

32. The system of claim 20, wherein the volume ratio of first phase to second phase is in the range of from about 20:80 to about 80:20.

33. The system of claim 20, wherein the volume ratio of the first phase to the second phase is in the range of from about 40:60 to about 60:40.

34. The system of claim 20, wherein the first phase forms a percolative path in the membrane.

35. The system of claim 20, wherein the second phase forms a percolative path in the membrane.

36. The system of claim 20, wherein the membrane is stable at a temperature in the range of 700-1000° C.

37. A method of purifying hydrogen purification, comprising:

providing a flow cell comprising a first oxidizing compartment and a second reducing compartment separated by a two-phase solid state ceramic membrane, wherein the first phase comprises an oxygen ion conductor and the second phase comprises a donor-doped n-type electronically conducting oxide;

directing the reforming gas across the membrane in the first compartment;

directing the steam across the membrane in the second compartment; and collecting purified hydrogen downstream from the second compartment by separating steam from hydrogen.

* * * * *

UNITED STATES PATENT AND TRADEMARK OFFICE
CERTIFICATE OF CORRECTION

PATENT NO.       : 7,588,626 B2            Page 1 of 1
APPLICATION NO.  : 11/255650
DATED            : September 15, 2009
INVENTOR(S)      : Gopalan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Twenty-first Day of September, 2010

David J. Kappos
*Director of the United States Patent and Trademark Office*